United States Patent [19]

Lemercier et al.

[11] Patent Number: 4,978,497
[45] Date of Patent: Dec. 18, 1990

[54] APPARATUS FOR THE THERMAL PROTECTION OF THE UPPER SUPPORT FERRULE OF A SUSPENDED VESSEL, PARTICULARLY IN A FAST NEUTRON NUCLEAR REACTOR

[75] Inventors: Guy Lemercier, Le Puy Sainte Reparade; Charley Renaux, Jouques, both of France

[73] Assignee: Commissariat a l'Energie Atomique, France

[21] Appl. No.: 477,296

[22] Filed: Feb. 8, 1990

[30] Foreign Application Priority Data

Feb. 10, 1989 [FR] France ............... 89 01749

[51] Int. Cl.$^5$ ............................................. G21C 15/12
[52] U.S. Cl. .................................................. 376/290
[58] Field of Search ............... 376/290, 291, 287, 298, 376/404, 403, 352

[56] References Cited

U.S. PATENT DOCUMENTS

| 4,154,651 | 5/1979 | Kenworthy et al. ............... 376/290 |
| 4,156,629 | 5/1979 | Andreani et al. .................... 376/291 |
| 4,167,445 | 9/1979 | Aubert et al. ...................... 376/291 |
| 4,298,431 | 11/1981 | Depierre et al. ..................... 376/290 |
| 4,477,410 | 10/1984 | Debru ................................. 376/290 |

FOREIGN PATENT DOCUMENTS

| 0064921 | 11/1982 | European Pat. Off. . |
| 2370344 | 6/1978 | France . |
| 2388375 | 11/1978 | France . |
| 2394870 | 1/1979 | France . |

Primary Examiner—Daniel D. Wasil
Attorney, Agent, or Firm—Michael N. Meller

[57] ABSTRACT

In order to ensure the cooling of the support ferrule of a vessel, such as the cylindrical internal vessel (14) of a fast neutron nuclear reactor, between said ferrule and an internal wall (20) containing a liquid metal at high temperature is placed a thermal protection apparatus (29). The latter comprises sealed collecting tanks (30) supplied with relatively cold, pressurized liquid metal by means of pipes (32), connected e.g. to the reactor bearing structure (16). This liquid metal is sprayed onto the ferrule by sprayers formed in the collecting tanks. On the side turned towards the wall (20), said tanks support elements (38) of a passive thermal protection structure.

13 Claims, 4 Drawing Sheets

APPARATUS FOR THE THERMAL PROTECTION OF THE UPPER SUPPORT FERRULE OF A SUSPENDED VESSEL, PARTICULARLY IN A FAST NEUTRON NUCLEAR REACTOR

DESCRIPTION

The invention relates to a thermal protection apparatus for maintaining at a creep-free temperature the upper support ferrule or cylinder shell of a suspended vessel, such as the main vessel or the cylindrical internal vessel of a fast neutron nuclear reactor.

In fast neutron nuclear reactors, the reactor core is placed within a vessel, called the main vessel, which is filled with liquid metal such as sodium and is suspended on a horizontal slab ensuring the sealing thereof. In integrated reactors, the main vessel also contains the primary pumps and heat exchangers of the primary circuit. Within the main vessel, an internal vessel makes it possible to separate the liquid metal at high temperature (approximately 550° C.) leaving the reactor core from the liquid metal cooled in the exchangers (to approximately 400° C.).

In a first design, more particularly illustrated by the French SUPER PHENIX reactor, the internal vessel has a stepped part traversed by the pumps and exchangers and whose upper portion internally duplicates the top portion of the main vessel. In another design, the internal vessel has a cylindrical shape and is directly suspended on the slab sealing the main vessel and independently of the latter.

In view of the fact that the temperature of the liquid metal contained in the internal vessel is above the creep temperature of steel (approximately 425° C.), it is necessary to ensure the cooling and thermal protection of the upper support ferrule of the main vessel of reactors incorporating a stepped internal vessel and the internal vessel of reactors having a cylindrical internal vessel, in order to prevent the creep of said ferrules by limiting the fatigue effect.

In the case of fast neutron reactors having a stepped internal vessel and as is more particularly illustrated by the French SUPER PHENIX reactor, this thermal protection is ensured by a so-called "weir" apparatus. In the latter relatively cool liquid metal taken from the bottom of the main vessel travels upwards under the action of the primary pumps into an annular space formed between said vessels and the baffle internally duplicating the latter. When it reaches the level of the upper edge of the baffle, the liquid metal flows into a second annular space formed between the baffle and a wall internally duplicating it and containing the high temperature liquid metal leaving the reactor core.

This known apparatus suffers from a certain number of disadvantages. Firstly, no thermal protection is ensured when the primary pumps are stopped, e.g. in the case of a breakdown, because the outflow of relatively cool liquid metal is then stopped. Moreover, said apparatus requires a fine adjustment of the seating of the flow plane for the cold sodium and without which said flow would only occur over part of the circumference and there would be only a partial cooling of the vessel. Finally, said apparatus leads to the existence of a complex production zone (called the triple point) at the location where the inner wall is connected to the baffle internally duplicating the main vessel, which makes it possible to monitor said zone.

The invention is directed at a thermal protection apparatus making it possible to ensure the cooling of the bearing structure of the main vessel of a fast neutron nuclear reactor having a stepped internal vessel, or the cooling of the bearing structure of the internal vessel of such a reactor with a cylindrical internal vessel, by obviating the disadvantages of the weir apparatus used at present, while having a certain number of additional advantages.

According to the invention, this result is obtained by means of an apparatus for the thermal protection of an upper support ferrule of a suspended vessel, said ferrule being internally duplicated by an internal wall containing a liquid at a first temperature above the creep temperature of the ferrule, said liquid being surmounted by a gas, said apparatus being characterized in that it comprises at least one sealed collecting tank placed between the ferrule and the internal wall and spaced therefrom, at least one pipe connecting said collecting tank to a zone containing liquid, which is normally under pressure, at a second temperature below the first temperature, sprayers formed in the collecting tank issuing into the gas on the side turned towards the ferrule, and a passive thermal protection structure supported by the collecting tank on the side turned towards the internal wall and spaced from the latter, in such a way that a first annular space is formed between the thermal protection apparatus and the ferrule and that a second annular space is formed between the thermal protection apparatus and the internal wall.

The first advantage of this apparatus is of ensuring both active and passive operation. In normal operation, the relatively cold liquid is sprayed by the sprayers against the support ferrule of the suspended vessel and trickles by gravity along the internal surface of said ferrule. Thus, a constant temperature is maintained and at a given altitude. Moreover, in the case of a breakdown of the active part of the apparatus, the passive thermal protection structure limits the heat flux and the temperature on the bearing surface to be protected.

Moreover, the injection of relatively cold liquid into a sealed collecting tank makes it possible to ensure the emission of discrete liquid jets over the entire periphery of the vessel without it being necessary to carry out a fine adjustment of the seating of the injection plane.

Finally, the triple point appearing in the conventional weir apparatus is eliminated, in such a way that the structure is simplified and permits, if necessary, an inspection of the interior of the vessel.

The apparatus according to the invention advantageously comprises at least one row of separate collecting tanks arranged end to end in a circumferential direction between the ferrule and the internal wall, each collecting tank carrying an element of the thermal protection structure. In this case, the modular elements of the system can be constructed in the factory and then transported to the location of the reactor. Moreover, they can be dismantled, which facilitates an internal inspection of the bearing structure and optionally its repair after emptying the liquid.

In a preferred embodiment of the invention, the collector and the thermal protection structure are totally supported via said pipe, the collector having abutments able to bear on the inner wall. This arrangement makes it possible to ensure a self-centering of the apparatus with respect to the bearing vessel by means of discrete jets of relatively cold liquid metal discharged by the sprayers. It also ensures the independence of the support of the apparatus with respect to the bearing structure.

As a function of the particular case, the collecting tanks can be formed either by a row of tanks having an approximately retangular vertical section, or by several superimposed rows of toroidal collecting tanks having an approximately circular vertical section.

The cone-like discrete jets discharged by the sprayers are oriented substantially perpendicularly to the ferrule and can have sufficiently open cones which intersect, if it is feared that the sprinkling of the vessel is inadequate.

Preferably, in the design of the cylindrical internal vessel, the thermal protection structure participates in a complementary manner in the radiological protection of the exchangers and the primary pumps. To this end, it comprises an upper edge located at a level above that of the upper edge of the internal wall and extends downwards approximately over the entire height of the latter.

This thermal protection structure can be advantageously constituted by at least two spaced plates extending parallel to the ferrule and to the internal wall and by means for preventing a natural convection flow between these plates.

The invention also relates to the application of the aforementioned thermal protection apparatus to the protection of the suspended upper ferrule of the main vessel of a fast neutron nuclear reactor with a stepped internal vessel and to the protection of the suspended upper ferrule of the internal vessel of a fast neutron nuclear reactor having a cylindrical internal vessel.

Various embodiments of the invention are described in nonlimitative manner hereinafter with reference to the attached drawings, wherein.

Figure 1:
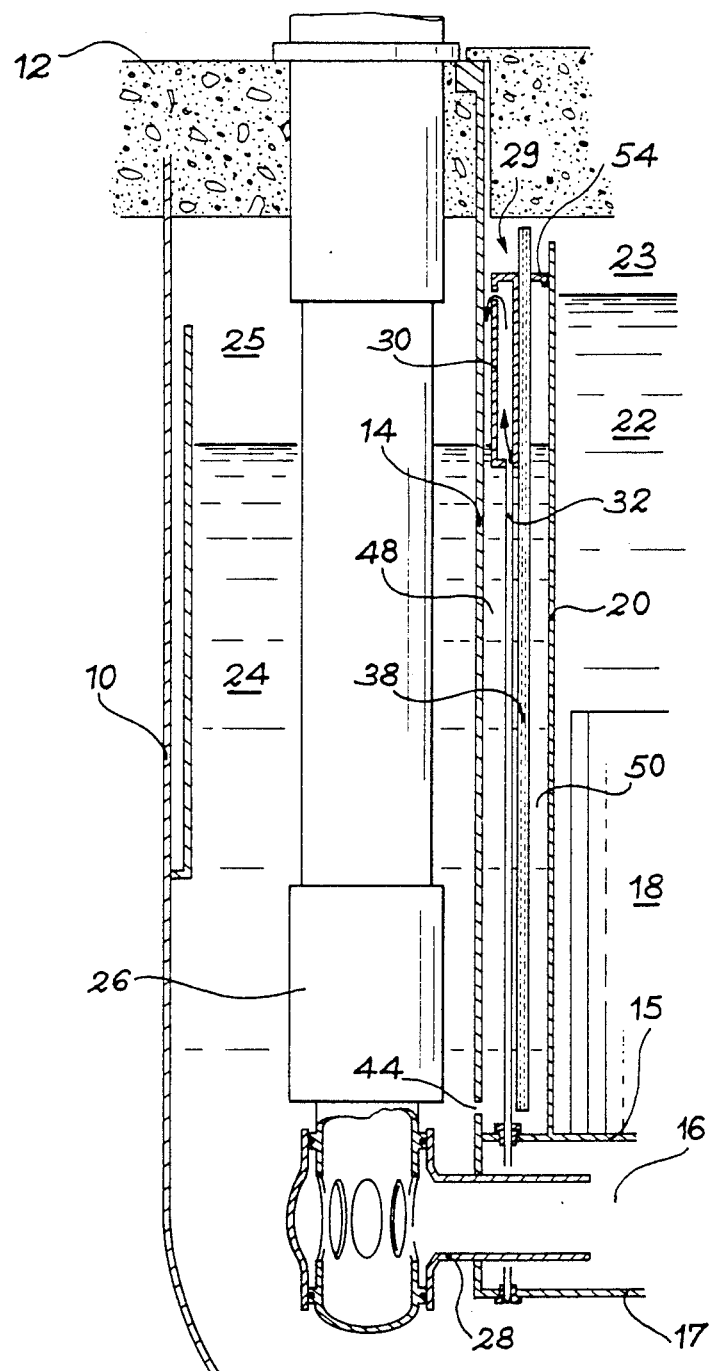
FIG. 1 is a cross-sectional view of part of a fast neutron nuclear reactor with a cylindrical internal vessel, in which the upper support ferrule of said internal vessel is equipped with a thermal protection apparatus according to the invention.

In FIG. 1, reference 10 designates the main vessel of a fast neutron nuclear reactor cooled by a liquid metal such as sodium. This main vessel 10 is suspended on a horizontal sealing slab 12. The sealing slab 12 also supports a cylindrical internal vessel 14 located in the central portion of vessel 10. The horizontal base 15 of the internal vessel 14 constitutes the upper plate of the bearing structure 16 for the supply and supporting of the reactor core 18. The bearing structure 16 is defined at its base by a horizontal lower plate 17.

Above the upper plate 15 of the bearing structure 16, the cylindrical internal vessel 14 is internally duplicated by a cylindrical internal wall 20. The interior of wall 20 constitutes a hot collector 22 containing liquid sodium at high temperature leaving the reactor core 18. The upper edge of wall 20 is located in a layer of neutral gas 23 covering the hot collector 22. The temperature of the sodium in hot collector 22, normally close to 550° C., is above the creep temperature of the steel from which the internal vessel 14 is made.

The space formed between the main vessel 10 and the cylindrical internal vessel 14 constitutes a cold collector 24, which is also filled with liquid sodium 24 at a lower temperature than the sodium of the hot collector 22. The cold collector 24 is also surmounted by a neutral gas layer 25. The pumps 26 and not shown exchangers of the primary circuit are placed in an annular portion of said space and suspended on slab 12.

In known manner for reactors having a cylindrical internal vessel, not shown pipes make it possible to supply the high temperature sodium contained in the hot collector 22 within wall 20 to the intake orifices of the exchangers. The lower temperature sodium is discharged from the exchangers by discharge orifices issuing directly into the cold collector 24. The sodium contained in the latter is then sucked up by pumps 26, which pass it directly into the bearing structure 16 via ducts 28.

In the reactor with a cylindrical internal vessel described hereinbefore, the support structure by which the cylindrical internal vessel 14 is suspended on slab 12 is at a risk of being exposed to significant thermal stresses, particularly due to the high temperature of the sodium contained in the hot collector 22.

According to the invention, an original thermal protection apparatus 29 is placed in the annular space separating the internal vessel 14 from wall 20, in order to maintain the support ferrule of the internal vessel 14 at a creepfree temperature, i.e. below 425° C., by limiting the fatigue effect.

Figure 2:
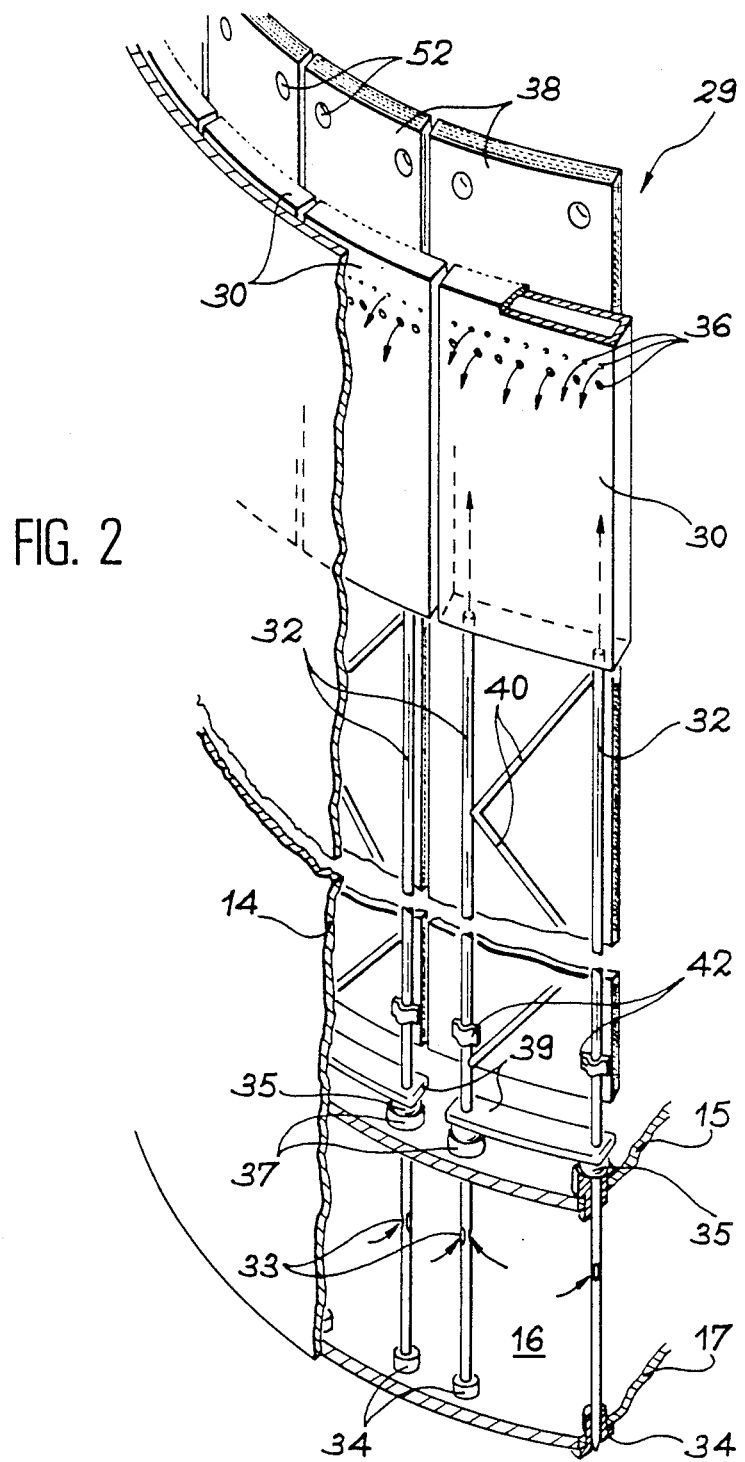
FIG. 2 is an exploded perspective view showing in greater detail the thermal protection apparatus equipping the reactor of FIG. 1.

This thermal protection apparatus 29 comprises, in the embodiment shown by FIGS. 1 and 2, a row of sealed, tight collecting tanks 30 having a rectangular vertical section and arranged end to end at the same level over the entire circumference of said space. The collecting tanks 30 are all identical and separated from one another by relatively small circumferential clearances. Each of the collecting tanks 30 has two opposite faces with a circular arc horizontal section, which are oriented parallel to the internal vessel 14 and to the wall 20, whilst being spaced therefrom.

The closed space defined within each of the collecting tanks 30 is linked with the bearing structure 16 of the reactor, e g. by two vertical pipes 32 issuing into the bottom of the collecting tanks and traversing the entire height of the bearing structure, as illustrated in FIG. 2. Within the bearing structure 16, each of the pipes 32 has at least one hole 33, by which the corresponding collecting tank is supplied with relatively cold sodium removed from the bearing structure 16.

The mounting of pipes 32 in the upper 15 and lower 17 plates of the bearing structure 16 is ensured by hydraulic locking in the same way as for the fuel assembly of core 18. Thus, the sealed lower end of each of the pipes 32 is centered in a centering bush 34 mounted in the lower plates 17 of core 16, whereas the pipes are supported by the abutment of a spherical protuberance 35 of each of the pipes on a conical bearing surface formed on a bush 37 mounted in the upper plate 15 of the core. As shown in FIG. 2, the two pipes 32 communicating with the same collecting tank 30 are also interconnected by a spacer 39 immediately above the spherical bearing surfaces 35 and by stiffeners forming a lattice 40, which gives the assembly a good rigidity. This structure makes it possible to support each of the collecting tanks 30 independently of the other on the bearing structure 16 of the reactor, while also ensuring that it can be dismantled.

Each of the collecting tanks 30 is equipped on its face turned towards the internal vessel 14 with at least one horizontal row of sprayers 36. In the embodiment illustrated in FIG. 2, the collecting tanks 30 have two rows of regularly spaced sprayers 36 located over the entire periphery of the vessel at two different levels, the sprayers of one row being arranged in staggered manner with respect to the sprayers of the other row. In this same embodiment, discrete, relatively cold liquid sodium jets are discharged by each of the sprayers in a direction approximately perpendicular to the internal surface of the wall of the internal vessel 14 arranged in facing manner.

As a result of the arrangement described hereinbefore, the overpressure produced by the primary pumps in the reactor bearing structure 16 has the effect of passing a portion of the relatively cold sodium from the bearing structure 16 into the collecting tanks 30. As the latter are completely sealed, apart from the sprayers 36, they are consequently normally completely filled with relatively cold liquid sodium under the effect of the pressure. Consequently when the primary pumps of the reactor are operating, relatively cold liquid sodium escapes through the sprayers 36 and wets the internal surface of the internal vessel 14, bearing in mind its high surface tension and then trickles by gravity along said wall and thereby ensures the cooling thereof.

As shown in FIG. 1, the annular space defined between the internal vessel 14 and the wall 20 internally duplicating said vessel is connected by calibrated holes 44 formed at the base of the vessel 14 with the cold collector 24. The relatively cold liquid sodium level in the two zones is consequently substantially the same. When the primary pumps 26 are operating, said level is slightly above the lower portion of the collecting tanks 30. The gravity flow of relatively cold liquid sodium from the sprayers 36 ensures the cooling of that portion of the internal vessel 14 located above said level, the sprayers themselves being located in the vicinity of the upper portion of the collecting tanks 30.

Advantageously, the altitude of the plane of the injection sprayers corresponds to the free level of the sodium in the collectors 22 and 24 when the primary pumps stop. The thermal gradient between the slab 12 and the sodium in the support ferrule of the internal vessel is consequently spread out in an optimum manner.

Apart from the active part described hereinbefore, the thermal protection apparatus 29 according to the invention also comprises an annular passive thermal protection structure constituted by several elements 38 supported independently of one another by each of the collecting tanks 30. Each of these elements 38 comprises a stack of sheets forming heat baffles fixed to the face of the corresponding collecting tank 30 turned towards the internal wall 20 and means such as horizontal plates making it possible to minimize the natural convection of the gas or sodium between the sheets.

As illustrated in FIG. 1, each of the elements 38 forming heat baffles has an upper edge located at a level above that of the upper edge of the internal wall 20 and it is downwardly extended over substantially the entire height of the annular space formed between the internal vessel 14 and the wall 20 up to the immediate vicinity of the upper plate of the bearing structure 16.

Moreover, in the circumferential direction, each of the elements 38 has the same circumferential length as the collecting tank 30 supporting it, but it is circumferentially displaced with respect to the latter, so as to bridge the gap circumferentially separating adjacent collectors 30.

Thus, the thermal protection apparatus according to the invention subdivides the annular space between the internal vessel 14 and the internal wall 20 into a first annular space 48 defined between the internal vessel 14 and the elements 38 and a second annular space 50 defined between said latter elements and the wall 20. The first annular spaces 48 supplied by the sprayers 36 of the collecting tanks 30 contain relatively cold sodium at a temperature of approximately 400° C., whereas the second annular spaces 50 contain sodium at an intermediate temperature of approximately 475° C. As these spacers are not tightly separated from the cold collector 24, the sodium level therein is substantially the same as that of the cold collector or is slightly above the same, as a function of the pressure drop defined by the passages 44 formed at the bottom of the internal vessel 14.

The levels of the sprayers 36 and the height of the elements 38 are chosen so as to make it possible to maintain a virtually constant temperature gradient of the support ferrule of the internal vessel 14, at the interface between the liquid sodium and the gas above the same, under the different operating conditions of the reactor. From this standpoint, the upward extension of the elements 38 to the vicinity of slab 12 makes it possible to protect from thermal radiation and the natural convection of the gas, the connecting area between the support ferrule and the slab 12. The downward extension of the elements 38 makes it possible to facilitate and stabilize the stratification of a sodium ring at a temperature close to that of the cold collector, so as to reduce thermal gradients in the connection zones of the bearing structure or other structures of the cold collector to the internal vessel. Moreover, the elements 38 surround the core and thus additionally participate in the radiological protection of the large reactor components, such as the exchangers and pumps. The elements 38 are fixed to each of the collecting tanks 30 e.q. by not shown pins. This fixing is completed between each of the thermal protection elements 38 and each of the corresponding pipes 32 by guides 42 (FIG. 2).

Holes 52 formed in the vicinity of the upper edge of each of the elements 38 make it possible to ensure the independent handling of each of the modules constituted by one of the collecting tanks 30, one of the elements 38 and the pipes 32 corresponding thereto, said modules resting on the bearing structure 16 via pipes 32.

Finally, each of the collecting tanks 30 has at its upper end abutments 54 which bear against the internal wall 20 under the effect of the reaction produced by the sodium jets discharged from the sprayers 36.

Figure 3:
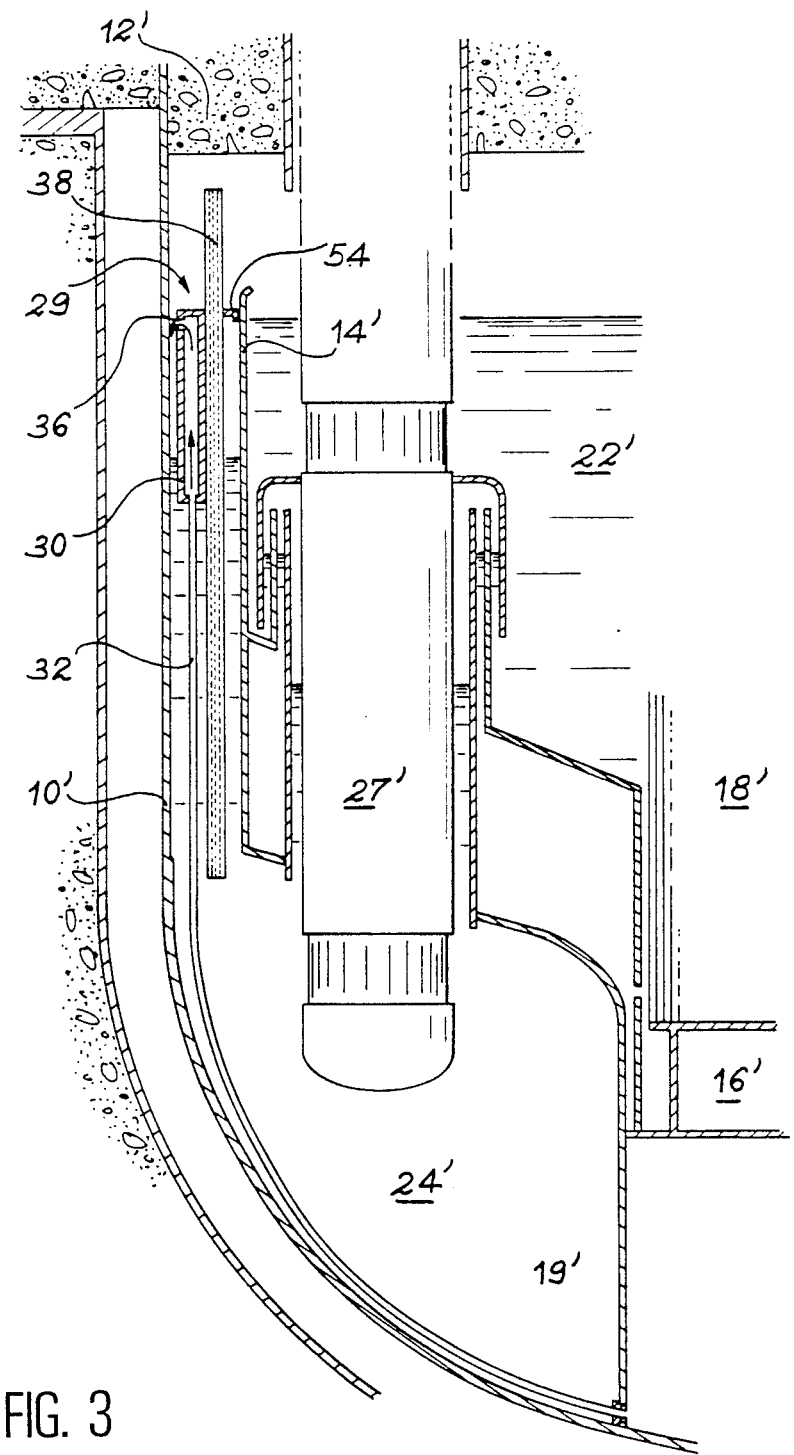
FIG. 3 is a sectional view comparable to FIG. 1 illustrating the application of the thermal protection apparatus according to the invention to the cooling of the upper support ferrule of the main vessel of a fast neutron nuclear reactor having a stepped internal vessel.

As illustrated by FIG. 3, the thermal protection apparatus according to the invention can also be used for cooling the support ferrule of the main vessel of a fast neutron nuclear reactor having a stepped internal vessel.

The fast neutron nuclear reactor illustrated in FIG. 3 comprises a main vessel 10' suspended on a sealing slab 12'. The reactor core 18' rests on a bearing structure 16' for the supply and supporting of the core, whereas the actual bearing structure 16' rests on the bottom of the main vessel via a deck 19'. An internal stepped vessel 14' is fixed at its base to the bearing structure 16' and widens so as to internally duplicate the main vessel 10' in its upper part. Thus, within the main vessel 10', vessel 14' defines a hot collector 22' containing relatively hot liquid sodium and a cold collector 24' containing relatively cold liquid sodium.

Not shown pumps and heat exchangers 27' are suspended on slab 12' and traverse the internal vessel 14'. When the pumps are operating, the liquid sodium consequently flows from the bearing structure 16' to the hot collector 22' through the reactor core 18' and then from the hot collector 22' to the cold collector 24' through exchangers 27'.

In a nuclear reactor of this type, the thermal protection apparatus 29 according to the invention is placed in the annular space defined between the upper cylindrical portion of vessels 10' and 14'.

In the embodiment illustrated in FIG. 3, said apparatus 29 has a structure identical to that described hereinbefore relative to FIGS. 1 and 2. Thus, it comprises a horizontal row of tight collecting tanks 30 supported and supplied with relatively cold liquid sodium by pipes 32. However, instead of being connected to the bearing structure 16', pipes 32 are connected to the deck 19', so as to remove relatively cold sodium from the cold collector 24' immediately below the bearing structure.

The collecting tanks 36 are also provided with sprayers 34 at the top of their faces turned towards the main vessel 10' and each of them supports an element 38 of a thermal protection structure. Element 38 extends upwards above the upper edge of the internal vessel 14' to the vicinity of slab 12' and downwards to the lower end of the upper cylindrical portion of the internal vessel 14'.

Figure 4:
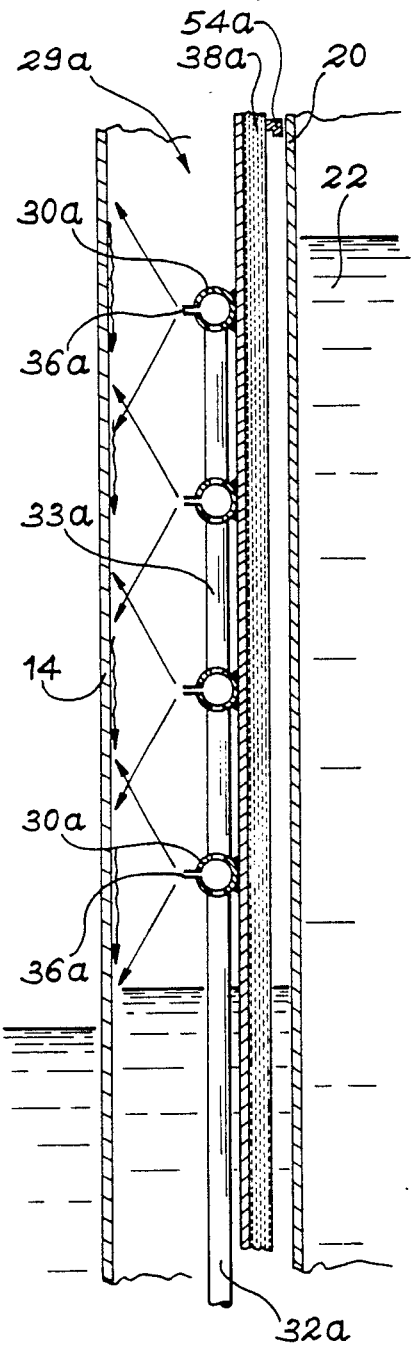
FIG. 4 is a cross-sectional view showing on a larger scale a variant of the thermal protection apparatus according to the invention applied to a reactor having a cylindrical internal vessel.
Figure 5:
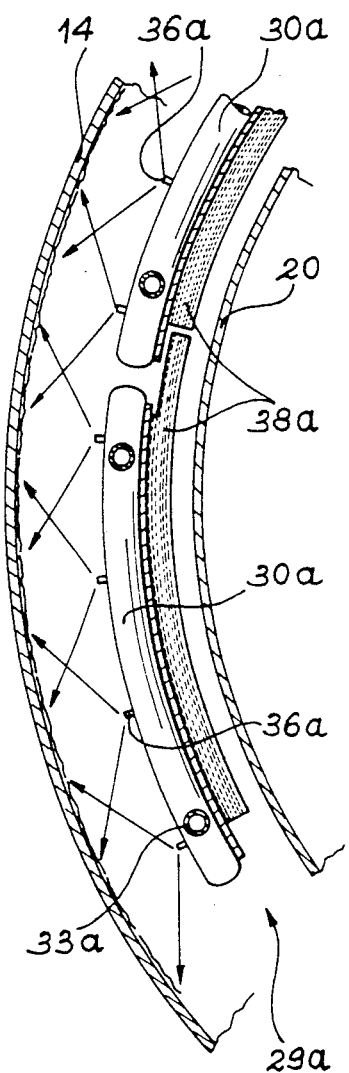
FIG. 5 is a plan view of the apparatus of FIG. 4.

FIGS. 4 and 5 illustrate another embodiment of the thermal protection apparatus according to the invention applied to the thermal protection of the upper support ferrule of the internal vessel of a fast neutron nuclear reactor. It should be noted that this embodiment could also be applied to the thermal protection of the main vessel of a fast neutron nuclear reactor having a stepped internal vessel, as described relative to FIG. 3.

In FIGS. 4 and 5, references 14 and 20 respectively designate the internal cylindrical vessels suspended on a fast neutron nuclear reactor and the wall internally duplicating said vessel and defining the hot collector 22.

In this embodiment, the apparatus 29a according to the invention comprises toroidal sealed collecting tanks 30a, i.e. having an approximately circular vertical section. Several, e.g. four rows of collecting tanks 30a are thus arranged end to end in superimposed, equidistant horizontal planes. The collecting tanks of the different rows are vertically aligned in such a way as to communicate with one another by vertical ducts 33a, which extend the ducts 32a by which the collecting tanks of the lower row are supplied with relatively cold liquid sodium from the not shown bearing structure of the reactor.

As in the embodiment described hereinbefore, each of the collecting tanks 30a is equipped with a certain number, e.g. four, of sprayers 36a on the side turned towards the internal vessel 14. The discrete jets discharged by the sprayers 36a can have sufficiently open conical shapes in such a way that they intersect. Thus, by a regular, equidistant distribution of the sprayers 36a over the entire periphery of the vessel and in altitude, it is possible to sprinkle the entire internal surface of the support ferrule of the vessel 14 to be protected, below a level approximately corresponding to the maximum liquid sodium level in the hot collector 22.

This arrangement makes it possible to minimize the relatively cold sodium flow to be removed, while permanently ensuring the cooling of the ferrule.

The apparatus 29a illustrated in FIGS. 4 and 5 also comprises on the side of the collecting tanks 30a turned towards the internal wall 20, elements 38 of the thermal protection structure, each of which is supported by a series of vertically aligned collecting tanks 30a. The structure of the elements 38a, as well as their dimensions, is identical to those of the elements 38 in the first embodiment described.

In the different embodiments and applications described in exemplified manner hereinbefore, it can be seen that the thermal protection apparatus according to the invention makes it possible to ensure in a satisfactory manner the cooling of the structure to be protected by means of a relatively simple structure and without preventing access to the vessel, when an inspection or repair thereto are necessary.

Furthermore, the apparatus according to the invention associates with a pump-controlled active operation, a passive operation ensuring a minimum efficiency even in the case of a stoppage of the primary pumps. The trickling of a continuous liquid sodium film over the ferrule to be protected, obtained as a result of the sprayers, makes it possible to normally maintain a virtually constant temperature at a predetermined altitude of the support ferrule to be protected under the different operating conditions of the reactor. Moreover, the thermal protection structure makes it possible to reduce the thermal gradients at the connections of the vessel to be protected to the other structures. Furthermore, in the case of a stoppage of the primary pumps, the collecting tanks protected by the elements of the thermal protection structure lead to a thermal inertia reducing the maximum temperature reached on the support ferrule.

Moreover, the apparatus is self-centered on the vessel to be protected by discrete sodium jets emitted by the sprayers, the hydraulic reactions due to these jets being taken up by the engagement of the abutments 54, 54a with the top of the wall internally duplicating the vessels to be protected.

In the particular case where the system is used in a reactor with a cylindrical internal vessel, the injection planes can be fixed at a relatively low altitude, bearing in mind the large volume of the cold collector compared with the hot collector. Thus, the length of the support structure can be increased, which makes it possible to eliminate the uncasing of the slab at the periphery in the case of reactors of the super phenix type.

The apparatus according to the invention does not require a fine setting of the seating of the injection plane of the cold sodium and the elements constituting the same can be made in the factory and then transported and installed in the reactor. In the case of a reactor with a cylindrical internal vessel, these elements can be dismantled and permit an internal inspection of the bearing structure and its possible repair after emptying the sodium.

Obviously the invention is not limited to the embodiments described in exemplified manner hereinbefore and covers all variants thereof. Thus, all the collecting tanks and thermal protection elements can be given shapes different from those described. In the same way the number of collectors and the number of supply pipes and sprayers can vary as a function of the intended application.

We claim:

1. Apparatus for the thermal protection of an upper support ferrule of a suspended vessel, said ferrule being internally duplicated by an internal wall containing a liquid at a first temperature above the creep temperature of the ferrule, said liquid being surmounted by a gas, said apparatus being characterized in that it comprises at least one sealed collecting tank placed between the ferrule and the internal wall and spaced therefrom, at least one pipe connecting said collecting tank to a zone containing liquid, which is normally under pressure, at a second temperature below the first temperature, sprayers formed in the collecting tank issuing into a gas on a side turned towards the ferrule, and a passive thermal protection structure supported by the collecting tank on the side turned towards the internal wall and spaced from the latter, in such a way that a first annular space is formed between the thermal protection apparatus and the ferrule and that a second annular space is formed between the thermal protection apparatus and the internal wall.

2. Apparatus according to claim 1, wherein at least one row of separate collecting tanks are arranged end to end in a circumferential direction between the ferrule and the internal wall, each collecting tank carrying an element of the thermal protection structure.

3. Apparatus according to claim 2, comprising a single row of collecting tanks with an approximately rectangular vertical section.

4. Apparatus according to claim 2, comprising several superimposed rows of collecting tanks with an approximately circular vertical section.

5. Apparatus according to claim 2, wherein the collecting tanks and the elements of the thermal protection structure have the same circumferential length, said elements being circumferentially displaced with respect to the collecting tank supporting them, so as to bridge the gaps circumferentially separating the collecting tanks.

6. Apparatus according to claim 1, comprising at least one row of regularly distributed sprayers, located at the same level within the vessel.

7. Apparatus according to claim 1, wherein the sprayers supply discrete, cone-shaped jets oriented substantially perpendicularly to said ferrule.

8. Apparatus according to claim 1, wherein the collecting tank and the thermal protection structure are completely supported via said pipe, the collecting tank having abutments able to bear on the internal wall.

9. Apparatus according to claim 1, wherein the thermal protection structure comprising an upper edge located at a level higher than that of the upper edge of the internal wall and extending downwards approximately over the entire height of the latter.

10. Apparatus according to claim 1, wherein the thermal protection structure comprises at least two spaced plates extending parallel to said ferrule and to the internal wall, as well as means for preventing a natural convection flow between these plates.

11. Apparatus according to claim 1, wherein the suspended vessel is a main vessel of a fast neutron nuclear reactor, said main vessel being filled with liquid metal and containing the reactor core, the internal wall being an internal vessel containing liquid metal at said first temperature, whereas the zone containing the liquid metal at the second temperature is a bearing structure for supporting and supplying the core with liquid metal.

12. Apparatus according to claim 1, wherein said suspended vessel is a cylindrical internal vessel of a fast neutron nuclear reactor, which also has a main vessel filled with liquid metal and which contains the reactor core, the latter resting on a bearing structure for supporting and supplying the core with liquid metal, the bearing structure being inturn supported by said cylindrical internal vessel, the latter being internally duplicated by the internal wall, which contains liquid metal at said first temperature.

13. Apparatus for thermally protecting an upper support ferrule of a suspended vessel which surrounds an internal wall containing a liquid having a first temperature greater than a creep temperature of the material of which said ferrule is made, said suspended vessel in turn being surrounded by a main vessel, said suspended vessel and said internal wall containing said liquid therebetween having a second temperature less than said creep temperature, said internal wall being supported by said suspended vessel, said ferrule having an inner circumferential surface with a vertical section which extends above the level of said liquid at said second temperature and below the level of said liquid at said first temperature, further comprising means for spraying said liquid between said suspended vessel and said internal wall onto said inner circumferential surface.

* * * * *